United States Patent [19]

Krob

[11] Patent Number: 5,468,120

[45] Date of Patent: Nov. 21, 1995

[54] MULTIPLE-PURPOSE UTILITY VEHICLE

[75] Inventor: Adolf Krob, Konz-Niedermenning, Germany

[73] Assignee: Faun GmbH, Germany

[21] Appl. No.: 235,685

[22] Filed: Apr. 29, 1994

[30] Foreign Application Priority Data

May 15, 1993 [DE] Germany .................. 43 16 364.5

[51] Int. Cl.⁶ .................................................. B60P 1/54
[52] U.S. Cl. ........................ 414/695; 414/549; 414/550
[58] Field of Search .................................. 414/546, 549,
414/550, 551, 553, 555, 565, 695, 687

[56] References Cited

U.S. PATENT DOCUMENTS

| | | | |
|---|---|---|---|
| 3,405,824 | 10/1968 | Tweedale | 414/695 |
| 3,501,031 | 3/1970 | Whitfield | 414/543 |
| 3,601,169 | 8/1971 | Hamilton et al. | 414/550 X |
| 3,765,554 | 10/1973 | Morrison | 414/555 X |
| 3,780,891 | 12/1973 | Steiner | 414/695 |
| 4,020,745 | 5/1977 | Iijima et al. | 414/695 X |
| 4,039,095 | 8/1977 | Long | 414/695 X |
| 4,095,839 | 6/1978 | Lawrence et al. | 296/190 |
| 4,183,711 | 1/1980 | Schaeff | 414/695 |
| 4,373,856 | 2/1983 | Taylor | 414/549 X |
| 4,378,193 | 3/1983 | Schaeff | 414/695 |
| 4,606,693 | 8/1986 | Pizzirani | 414/695 X |
| 5,018,929 | 5/1991 | Carson | 414/555 X |

FOREIGN PATENT DOCUMENTS

| | | | |
|---|---|---|---|
| 655747 | 1/1963 | Canada | 414/551 |
| 1036165 | 8/1958 | Germany | 414/549 |
| 1960552 | 1/1979 | Germany. | |

Primary Examiner—David A. Bucci
Attorney, Agent, or Firm—Laff, Whitesel, Conte & Saret, Ltd.

[57] ABSTRACT

A multiple-purpose utility vehicle has a working boom which is displaceably guided on a guide rail by a supporting carriage in the longitudinal direction of the vehicle. The guide rail is arranged at the side of the driver's cabin and integrated within the vehicle. The working boom is supported on the supporting carriage pivotably by more than 240° so that a tool arranged at its end can be pivoted forward of the driver's cabin or backward of the driver's cabin. In all its positions the working tool is easy to be seen by the driver.

6 Claims, 5 Drawing Sheets

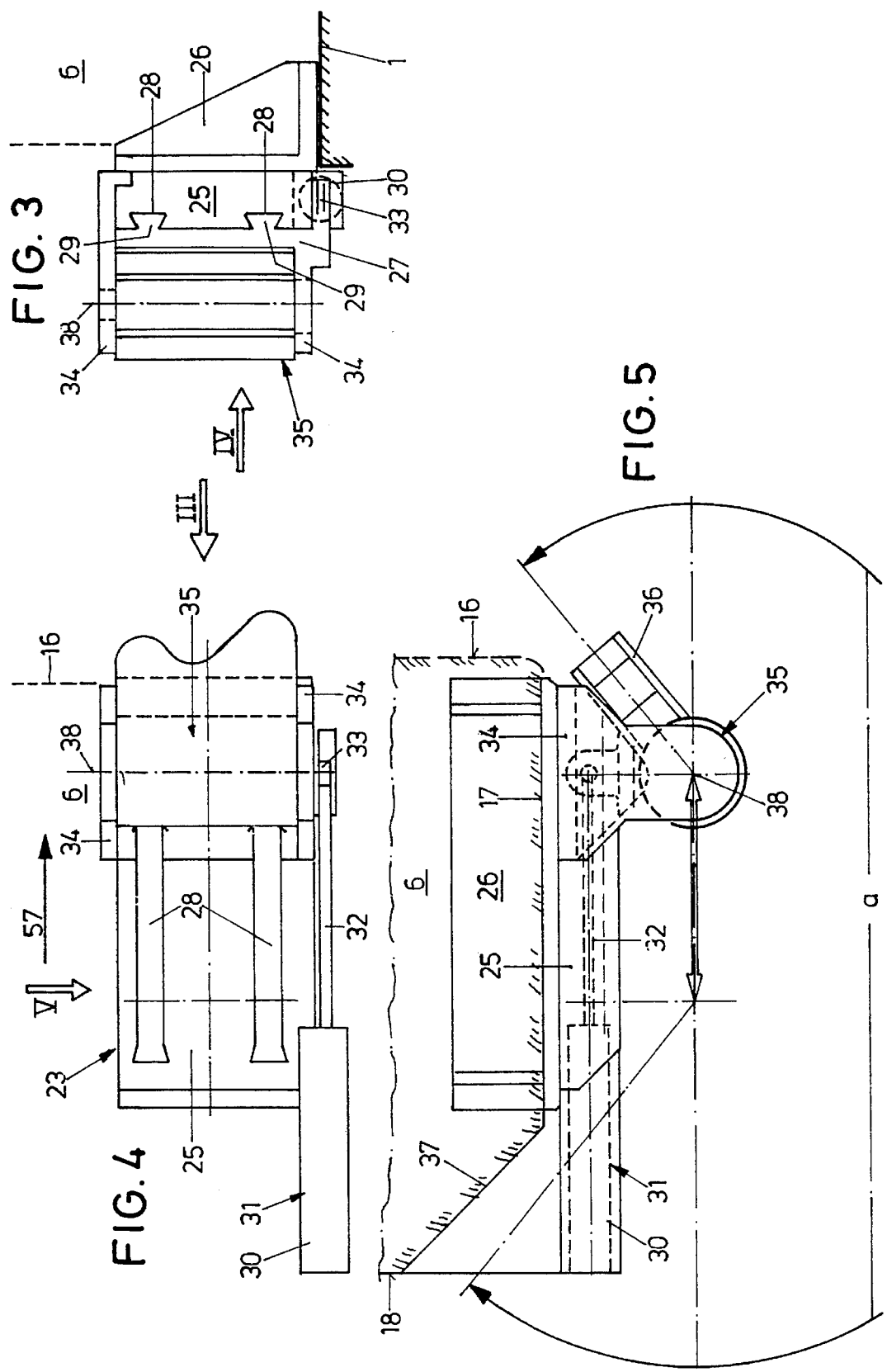

MULTIPLE-PURPOSE UTILITY VEHICLE

BACKGROUND OF THE INVENTION

1. Field of the Invention

The invention relates to a multiple-purpose utility vehicle comprising a vehicle frame supportable on the ground by means of wheels defining a contact surface, a driver's cabin extending over part of the frame and a working boom which is pivotably movable by means of pivoting actuators and to the free outer end of which a tool is attachable.

2. Background Art

In a known vehicle of the generic type the working boom is arranged on the vehicle frame behind der driver's cabin where a loading area is provided otherwise. The driver can see a tool applied to the working boom only to a limited extent when working and has to get out of the cabin very often to make sure of the correct position of the tool. Moreover, the loading area is not or only to a certain extent available for charges.

SUMMARY OF THE INVENTION

It is an object of the invention to embody a multiple-purpose utility vehicle of the generic type such that the tool has an ample range of operation and that the driver can always see the tool.

According to the invention, this object is solved in that the working boom is connected with the vehicle by means of a holding device in the vicinity of a side wall of the driver's cabin and is pivotable by at least 180° about a rotational axis perpendicular to the contact surface from a position oriented in the direction of travel of the vehicle into a position opposite to the direction of travel by means of a rotary actuator. An extraordinarily wide operational range of permanent visual control by the driver is created by the holding device of the working boom being arranged on one side of the driver's cabin and by its being pivotable about a vertical axis by at least 180°. The loading area as a rule arranged behind the driver's cabin is not substantially affected by this arrangement of the working boom.

In particular the configuration, according to which the holding device has a guide rail extending along the driver's cabin substantially in the direction of travel of the vehicle and a supporting carriage which is displaceably guided on the guide rail in the direction of travel and on which the working boom is supported pivotably about the rotational axis, serves to achieve that the operational range of the working boom is extended drastically, it being ensured by this configuration that the working boom and thus the tool can be pivoted into the range forward of and backward of the driver's cabin. The operator has optimal visual conditions in any working position, i.e. he can see the tool located on the working boom. As a result, it is very easy for the operator in the driver's cabin to proceed with exchanging tools on the working boom without any need of being directed. On the other hand, the effect is that the tool can be displaced additionally in the longitudinal direction of the vehicle. In keeping with the further advantageous embodiment according to which, approximately in alignment with the guide rail in the direction of travel, a recess is formed on the frame, into which the working boom is pivotable at least partially, it is attained that the working boom—if necessary with a tool mounted to it—can be arranged in the recess on the frame for the position of road travel. This leads to a deep center of gravity of the vehicle as a whole for travels to take up duty.

Simultaneously, the driver's visual range is not impeded during travels to take up duty, i.e. for normal motion of the vehicle out of duty.

Further features, details and advantages of the invention will become apparent from the ensuing description of an example of embodiment taken in conjunction with the drawing.

BRIEF DESCRIPTION OF THE DRAWING

FIG. 3 is a front view of a holding device of the working boom according to the arrow III of FIGS. 2 and 4, FIG. 4 is a lateral view of the holding device according to the arrow IV of FIGS. 1 and 3, FIG. 5 is a plan view of the holding device according to the arrow V of FIGS. 3 and 4.

DESCRIPTION OF THE PREFERRED EMBODIMENT

Figure 1:
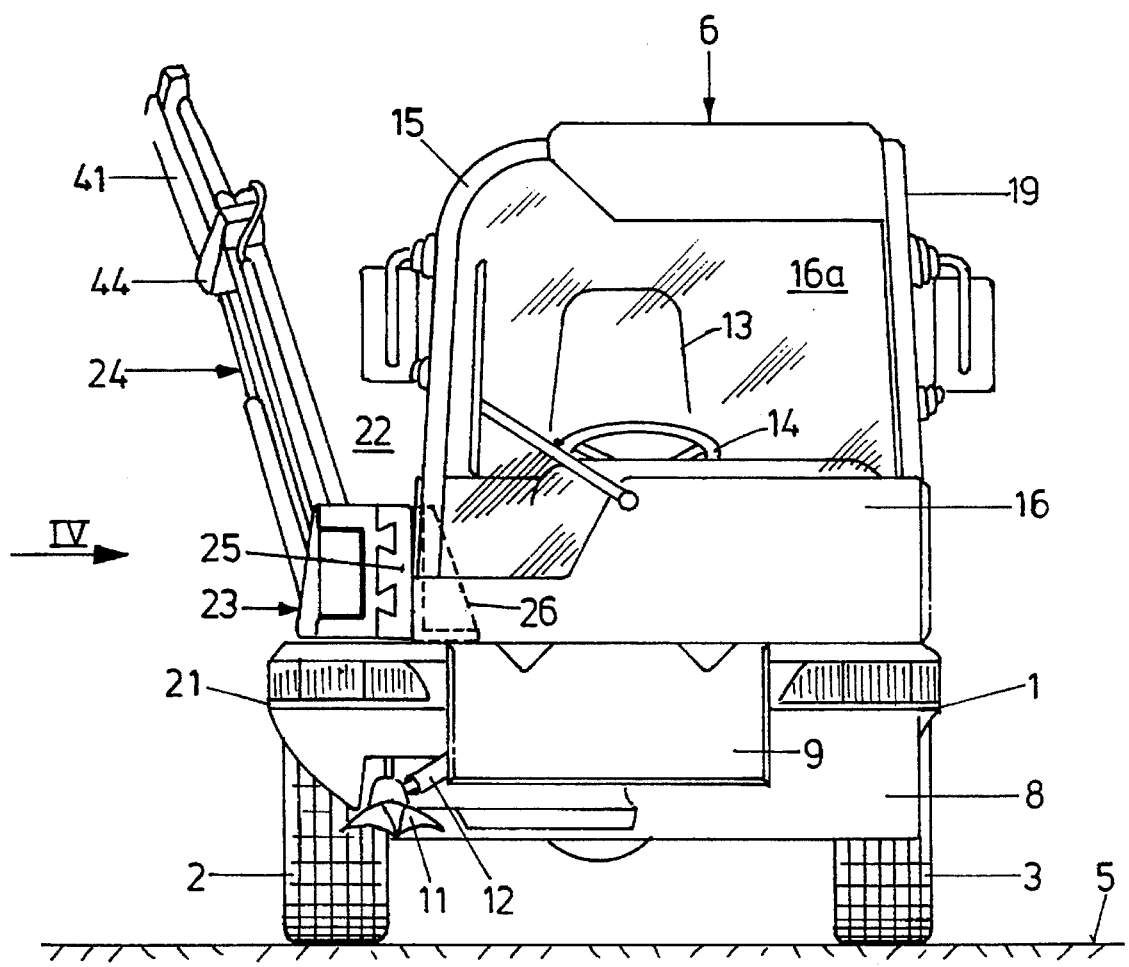
FIG. 1 is a front view of a multiple-purpose utility vehicle.

The vehicle illustrated in the drawing is a multiple-purpose utility vehicle usually having a vehicle frame 1 which, by way of a right front wheel 2, a left front wheel 3 and rear wheels 4, bears against the ground 5 where the wheels 2, 3, 4 define a contact surface. The front wheels 2, 3 are steerable. The rear wheels 4 are driven by a motor—not shown. The frame 1 supports a driver's cabin 6 above the front wheels 2, 3 and a box-like loading surface 7 on its middle and rear portion. An adaptation blade 9 for the application of front tools—not shown—is arranged on a front bumper 8 connected with the frame 1. Front supporting arms 11, of which only one is shown, are also arranged in this portion. These supporting arms 11 can be exited downwards by a supporting drive formed by a hydraulically actuatable piston-cylinder drive 12 so that they bear against the ground 5, whereby the vehicle is tightly anchored on the ground 5 in a working position. This applies correspondingly to further supporting arms 11 not shown.

A seat 13 for the driver and, in front of the seat 13, a steering wheel 14 for steering the front wheels 2, 3 are arranged in the driver's cabin 6. As seen in the drawings, the driver's cabin 6 is essentially rack-like, i.e. it consists predominantly of spars 15, between which large-surface windows are arranged and retained so that the front wall 16 is substantially formed by a front window 16a, the right side wall 17 by a right side window 17a and the rear wall 18 and the left side wall 19 are likewise formed by windows not shown in the drawing. A door, which is not shown either, is arranged in the left side wall 19.

The driver's cabin 6 is arranged non-symmetrically on the frame 1, i.e. it extends on one—the left—side as far as to the associated—left—side of the frame 1. On the other side—the right side—the driver's cabin 6 is offset in relation to the associated—right—side 21 of the frame 1 inwards referred to the latter. As seen in FIG. 1, the driver's cabin 6 extends as far as over the left front wheel 3 on the left side, whereas on the right side, the driver's cabin 6 does not reach over the associated right front wheel 2. A holding device 23 for a working boom 24 is provided in the free space 22 on the right side 21 above the frame 1 beside the driver's cabin 6. The holding device 23 has a guide rail 25 extending along the right side wall 17 of the driver's cabin 6 from the latter's front wall 16 to the latter's rear wall 18, and that under the seat 13 for the driver. With its side facing the driver's cabin 6, the guide rail 25 is arranged on an angular console 26 by means of screws or by welding. The console 26 is secured to the frame 1 in like manner. A supporting carriage 27 is displaceably guided on the guide rail 25 on the latter's outside facing away from the driver's cabin 6. To this effect, the guide rail 25 has two guiding grooves 28 of dove-tail cut arranged one above the other and extending parallel to each other substantially over the entire length of the guide rail 25 and in which guiding webs 29 of the supporting carriage 27 are arranged that are suited in cross-section. Since the guiding grooves 28 are open outwards at least at one end, the supporting carriage 27 can be mounted easily by being placed on the guide rail 25 from this side. A cylinder 30 of a hydraulically actuatable displacing drive 31 of linear effect is arranged on the underside of the guide rail 25, namely in the latter's rear portion, the piston rod 32 of which cylinder 30 is fixed on the underside of the supporting carriage 27 by means of an articulation 33. The supporting carriage 27 can be moved along the guide rail 25 over the entire length of the driver's cabin 6 by means of this displacing drive 31.

On the side facing away from the driver's cabin 6, the supporting carriage 27 has two cheeks 34 extending horizontally and in parallel to each other and between which a hydraulically actuatable rotary actuator 35 is positioned having a receptacle 36 for the working arm 24 arranged on it. As seen in FIG. 5, this receptacle 36 can be pivoted by a pivot angle a of about 250° by means of the actuator 35. When the supporting carriage 27 is displaced as far as to the front wall 16 of the driver's cabin 6, i.e. when the piston rod 32 of the drive 31 is exited completely, then the receptacle 36 can be pivoted into the position shown on the right in FIG. 5, in which it projects forward of the driver's cabin 6. When the piston rod 32 is entirely retracted, i.e. when the supporting carriage 27 is in its rear position in the vicinity of the rear wall 18 of the driver's cabin 6, then the receptacle 36 can be pivoted into a position biased backward of the rear wall 18. The right side wall 17 has a bevelled wall portion 37 where it passes into the rear wall 18 so that the driver's cabin 6 is not an obstacle in this area. As seen in particular in FIG. 5, the receptacle 36 can perform pivotings of slightly more than 180° about the rotational axis 38, perpendicular to the contact surface (ground 5), of the rotary actuator 35 even in the middle portion of the guide rail 25.

The working boom 24 is articulated on the receptacle 36. It comprises an inner arm 40 articulated on the receptacle 36 by a hinge 39 and an outer arm 41 articulated on the outer end 42 of the inner arm 40 by means of a hinge 43. A console 44 engaging with a pivoting actuator 45 for the inner arm 40 is arranged in a middle portion of the inner arm 40. The pivoting actuator 45 consists of a hydraulically actuatable piston-cylinder drive which is on the one hand articulated on the receptacle 36 by means of an articulation 46 and on the other hand on the console 44 by an articulation 47. Further, a pivoting actuator 48 for the outer arm 41 is provided, likewise consisting of a hydraulically actuatable piston-cylinder drive and secured to the console 44 on the one hand and to the outer arm 41 on the other hand, in each case by an articulation 49, 50. A receptacle 52 for a tool 53, for instance a shovel, is pivotably arranged on the free outer end 51 of the outer arm 41. The receptacle 52 and thus the tool 53 are pivotable by means of a tool-pivoting actuator 54, which is likewise a hydraulically actuatable piston-cylinder drive connected with the outer arm 41 on the one hand, namely in the proximity of the hinge 43, and with the receptacle 52 on the other hand, in each case by means of an articulation 55 and 56.

Figure 2:
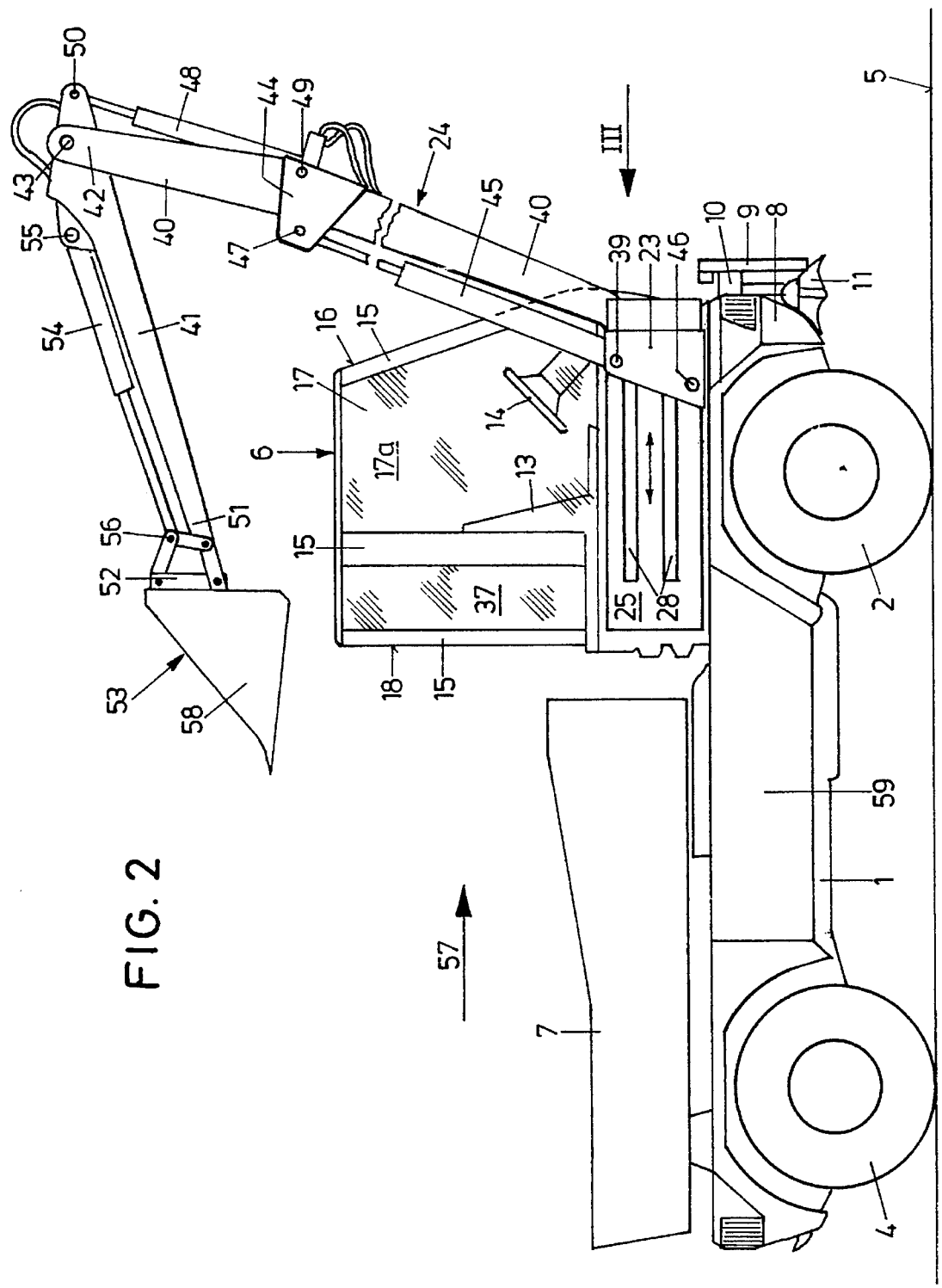
FIG. 2 is a lateral view of the vehicle with the working boom pivoted upwards.

The inner arm 40 can be lifted and lowered by actuation of the pivoting actuator 45. The position of the outer arm 41 in relation to the inner arm 40 can be modified by actuation of the pivoting actuator 48. The position of the receptacle 52 and thus the position of the tool 53 in relation to the outer arm 41 can be modified by actuation of the tool-pivoting actuator 54. Consequently, it is possible for the tool 53 to work on the ground or to lift loads, for instance earth, from the ground. When a bucket is arranged as a tool 53, this bucket can be pivoted from the ground 5 into any position attainable by the pivoting of the actuators 45, 48 and 54 and by the actuation of the rotary actuator 35. Attention is drawn to the fact that in the position shown in FIGS. 1 and 2, the working boom is pivoted backwards towards the guide rail 25 by means of the rotary actuator 35 contrary to the position of the receptacle 36 shown in FIG. 5. When the working boom 24 takes a position corresponding to the position of the receptacle 36 of FIG. 5, then the outer arm 41 with the tool 53 will project forward of the vehicle in the direction of travel 57. The direction of travel 57 corresponds to the longitudinal direction of the vehicle.

Figure 6:
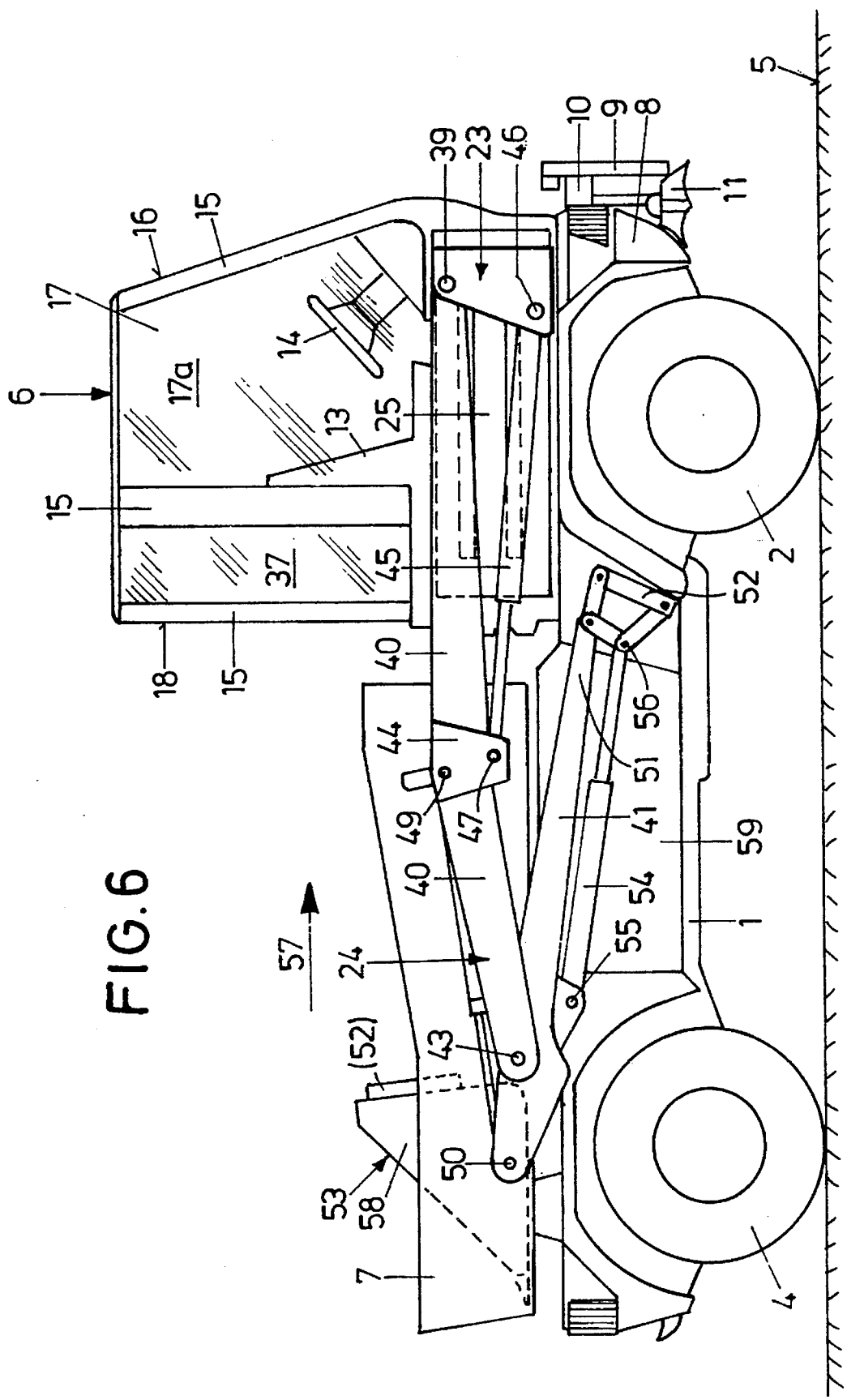
FIG. 6 is a lateral view of the vehicle with the working boom being moved into the position of road travel and with the tool being placed on the loading area.

FIG. 6 illustrates that the tool 53, the mentioned bucket 58 in the present case, can be placed on the loading area 7 for road travel. The outer arm 41 is pivoted towards the inner arm 40 and then the entire working boom 24 is moved by the rotary actuator 35 into a horizontal position opposite to the direction of travel 57, the outer arm 41 coming to rest under the inner arm 40. In particular in the vicinity of its free outer end 51, the outer arm 41 moves into a recess 59 on the vehicle frame 1 between the right front wheel 2 and the associated rear wheel 4. In this case, the supporting carriage 27 is in its front position referred to the direction of travel 27.

Figure 7:
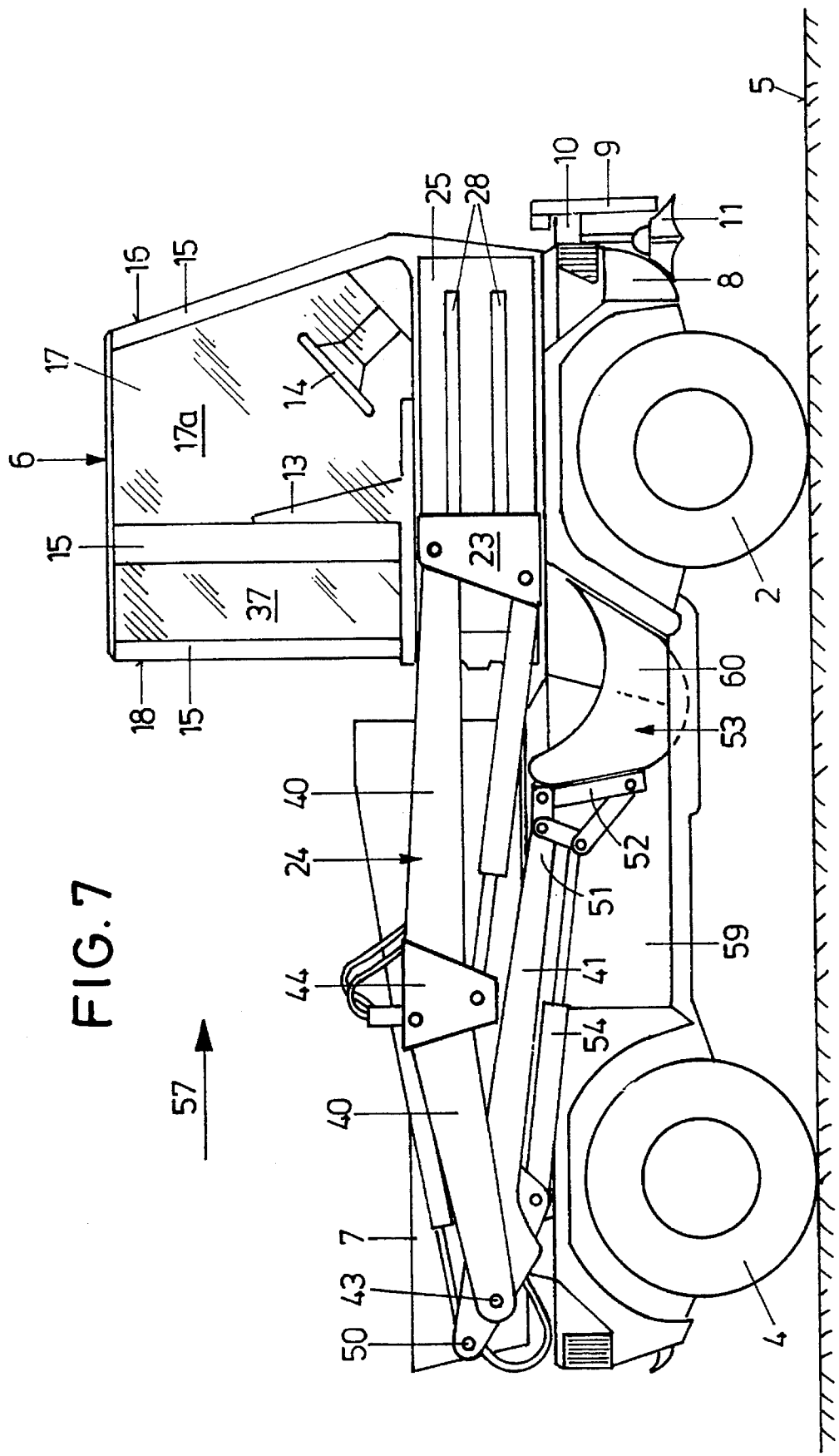
FIG. 7 is a lateral view of the vehicle with another tool remaining on the working boom even during road travel.

When a shovel 60 serving to excavate comparatively narrow ditches of 30 to 50 cm of width is used as a working tool 53, then this shovel 60 may remain attached to the receptacle 52 even in the position of travel of the working boom 24—as seen in FIG. 7. In this case, the supporting carriage 27 with the working boom 24 is displaced further backwards opposite the direction of travel 27 of the vehicle so that the receptacle 59 offers room also for the shovel 60.

By reason of the specified configuration, the driver always has a good sight of the working tools 53, and that in all the latters' positions in front of, beside or behind the driver's cabin 6. The vehicle has a hydropneumatic spring system with a height control, which is known and, therefore, not shown, so that stable driving qualities and good across-country mobility are possible even with different loads. By reason of such a height control it is easy attach front working tools to the adaptation blade 9 or to detach them. Of course, such a height control has additional further advantages for the use of the vehicle.

What is claimed is:

1. A multiple-purpose utility vehicle comprising:

a vehicle frame (1);

front wheels (2, 3);

rear wheels (4), said front wheels (2, 3) and said rear wheels (4) supporting said vehicle frame (1) on the ground and defining a contact surface;

a direction of forward travel (57);

a driver's cabin (6) extending over a part of and being stationary with respect to said vehicle frame (1) and having a front wall (16), a side wall (17) and a rear wall (18); a holding device (23) in the vicinity of said side wall (17) of the driver's cabin (6), the holding device (23) having a guide rail (25) which extends along the driver's cabin (6) substantially in the direction of travel (57) of the vehicle and which is stationary with respect to the frame (1), and a supporting carriage (27) which is displaceably guided on the guide, rail (25) in the direction of travel (57);

a working boom (24) which is supported on the supporting carriage (27) and which is pivotable by more than 240° about a rotational axis (38) perpendicular to the contact surface from a position oriented in the direction of travel (57) of the vehicle and forward of the front wall (16) into a position opposite to the direction of travel (57) and backward of the rear wall (18) and which working boom (24) has a free outer end (51) and is pivotably movable by pivoting actuators (45, 48, 54);

a rotary actuator (35) on said supporting Carriage (27) positioning said working boom (24) about said rotational axis (38); and a tool (53) which is attached to the free outer end (51) of the boom (24).

2. A vehicle according to claim 1, wherein a displacing drive (31) engages with the supporting carriage (27).

3. A vehicle according to claim 1, wherein the guide rail (25) is arranged in a free space (22) at the side of the driver's cabin (6) and above a front wheel (2).

4. A multiple-purpose utility vehicle comprising:

a vehicle frame (1):

front wheels (2, 3);

rear wheels (4), said front wheels (2, 3) and said rear wheels (4) supporting said vehicle frame (1) on the ground and defining a contact surface:

a direction of forward travel (57):

a driver's cabin (6) extending over a pan of and being stationary with respect to said vehicle frame (1) and having a front wall (16), a side wall (17) and a rear wall (18);

a holding device (23) in the vicinity of said side wall (17) of the driver's cabin (6), the holding device (23) having a guide rail (25) which extends along the driver's cabin (6) substantially in the direction of travel (57) of the vehicle and which is stationary with respect to the frame (1), and a supporting carriage (27) which is displaceably guided on the guide rail (25) in the direction of travel (57);

a working boom (24) which is supported on the supporting carriage (27) and which is pivotable by more than 240° about a rotational axis (38) perpendicular to the contact surface from a position oriented in the direction of travel (57) of the vehicle and forward of the front wall (16) into a position opposite to the direction of travel (57) and backward of the rear wall (18) and which working boom (24) has a free outer end (51) and is pivotably movable by pivoting actuators (45, 48, 54):

a rotary actuator (35) on said supporting carriage (27) positioning said working boom (24) about said rotational axis (38);

a tool (53) which is attached to the free outer end (51) of the boom (24); and a recess (59) formed on the frame (1) and approximately in alignment with the guide rail (25) in the direction of travel (57), into which recess (59) the working boom is pivotable at least partially.

5. A vehicle according to claim 4, wherein a displacing drive (31) engages with the supporting carriage (27).

6. A vehicle according to claim 4, wherein the guide rail (25) is arranged in a free space (22) at the side of the driver's cabin (6) and about a front wheel (2).

* * * * *